(12) United States Patent
Taylor-Haw et al.

(10) Patent No.: US 8,487,584 B2
(45) Date of Patent: Jul. 16, 2013

(54) ELECTRIC VEHICLE CHARGING STATION

(75) Inventors: Calvey Kenneth Taylor-Haw, Hove (GB); Brandon Haw, London (GB); Gregory Carlyon Simmons, Brighton (GB)

(73) Assignee: Elektromotive Ltd., Brighton, East Sussex (GB)

(*) Notice: Subject to any disclaimer, the term of this patent is extended or adjusted under 35 U.S.C. 154(b) by 475 days.

(21) Appl. No.: 12/308,034

(22) PCT Filed: Jun. 8, 2007

(86) PCT No.: PCT/GB2007/002131
§ 371 (c)(1),
(2), (4) Date: May 26, 2009

(87) PCT Pub. No.: WO2007/141543
PCT Pub. Date: Dec. 13, 2007

(65) Prior Publication Data
US 2010/0013434 A1    Jan. 21, 2010

(30) Foreign Application Priority Data
Jun. 8, 2006   (GB) .................................. 0611332.8

(51) Int. Cl.
*H02J 7/00*     (2006.01)
(52) U.S. Cl.
USPC ........................................................ 320/109
(58) Field of Classification Search
USPC ........................................................ 320/109
See application file for complete search history.

(56) References Cited

U.S. PATENT DOCUMENTS

| | | | |
|---|---|---|---|
| 4,532,418 A | 7/1985 | Meese et al. | |
| D308,267 S | 5/1990 | Bradd | 32/31 |
| 5,202,617 A | 4/1993 | Nor | 320/2 |
| 5,272,431 A | 12/1993 | Nee | 320/2 |
| 5,306,999 A | 4/1994 | Hoffman | 320/2 |
| D354,739 S | 1/1995 | Durham et al. | 13/184 |
| 5,451,755 A | 9/1995 | Duval et al. | 235/381 |
| 5,461,298 A * | 10/1995 | Lara et al. | 320/109 |
| 5,461,299 A | 10/1995 | Bruni | 320/190 |
| 5,462,439 A * | 10/1995 | Keith | 320/109 |
| 5,548,200 A | 8/1996 | Nor | 320/27 |
| 5,563,491 A | 10/1996 | Tseng | 320/2 |
| 5,627,448 A * | 5/1997 | Okada et al. | 439/133 |
| D428,596 S | 7/2000 | Birkestrand | 13/7 |
| 6,157,162 A | 12/2000 | Hayashi et al. | 320/104 |
| 6,614,204 B2 * | 9/2003 | Pellegrino et al. | 320/109 |
| 7,086,907 B2 | 8/2006 | Bhavnani | 439/628 |
| D532,372 S | 11/2006 | Keating | 13/108 |
| D532,745 S | 11/2006 | Gaber et al. | 13/108 |
| D539,218 S | 3/2007 | Gaber et al. | 13/108 |
| D559,484 S | 1/2008 | Fjellman | 32/31 |
| D597,937 S | 8/2009 | Haw | 13/118 |
| 2002/0030467 A1 * | 3/2002 | Small | 320/107 |
| 2005/0104555 A1 | 5/2005 | Simmonds-Short | 320/107 |
| 2007/0063669 A1 | 3/2007 | Keating | 320/107 |
| 2007/0126395 A1 | 6/2007 | Suchar | |

FOREIGN PATENT DOCUMENTS

| | | |
|---|---|---|
| AU | 2007255206 | 6/2007 |
| CA | 2654053 | 6/2007 |
| DE | 4213159 | 10/1993 |
| DE | 4414008 | 10/1995 |
| DE | 19502223 | 8/1996 |
| DE | 29820531 | 4/1999 |
| EP | 0552736 A1 | 7/1993 |
| EP | 0552737 | 7/1993 |
| EP | 0609181 A2 | 8/1994 |
| EP | 0980055 A1 | 2/2000 |
| EP | 1205340 | 5/2002 |
| EP | 0 609 181 | 5/2007 |
| GB | 2352886 | 7/1999 |
| GB | 243979 | 12/2007 |
| GB | 2438979 | 12/2007 |
| JP | 10262303 A | 3/1997 |
| JP | 10-262303 | 9/2008 |
| NZ | 574044 | 1/2009 |
| WO | WO93/08630 | 4/1993 |
| WO | WO2007045792 | 4/2007 |
| WO | WO2007105579 | 9/2007 |

OTHER PUBLICATIONS

Rochereau et al. "EDF and the Electric Vehicle: Comprehensive and Standardised Charging Facilities", pp. 737-741 (Oct. 13, 996.
"La Voiture Urbaine Electrique Par Abonnement Peugeot Lance Le Systeme Tulip." Revue Automobile, Buechler Grafino AG, Berne, CH (9-(16):23-24 (Apr. 13, 1995).
Lin C. et al. "The Installation on Public Area of Recharging Terminals for Electric Vehicles." International Electric Vehicle Symposium—Anaheim. San Francisco, EVAA, US. vol. 1, Symp. 12, pp. 126-135 (Dec. 5, 1994).
UK Intellectual Property Office Third Party Observation Re: Patents Act 1977: Observations under Section 21—"City of Westminister Installation of Two On-Street Recharging Points for Electric Vehicles".
"Borne for Electric Vehicle Type BVE" (Jun. 27, 2008).
"Borne LRH Free Service Reference: BDRLRH VEM01" (Jun. 28, 2008).

(Continued)

*Primary Examiner* — Arun Williams
(74) *Attorney, Agent, or Firm* — Ballard Spahr LLP

(57) ABSTRACT

The present application relates to a charging station operable in a charging cycle for charging an electric vehicle. The charging station has a key-activated controller for controlling the charging cycle. The application also relates to a key for operating the charging station. Furthermore, the application relates to a charging station having an interface for connecting the charging station to a data network. The application also relates to a charging station having a socket for receiving a plug and a key-operated locking mechanism for locking a plug in said socket. A frangible panel movable between an open position and a closed position may be provided. A processor may be provided for generating data to impose a financial charge on an individual for using the charging station. The application also relates to methods of operating a charging station including the steps of obtaining user identification data; supplying electricity to a charging socket; and generating data for levying a financial charge on the user.

27 Claims, 7 Drawing Sheets

OTHER PUBLICATIONS

Search Report Under Section 17(5) mailed by the U.K. Intellectual Property Office on Sep. 20, 2007 for U.K. Patent Application No. GB0711114.9, which was filed on Jun. 8, 2007 (Inventors: Taylor-Haw et al; Applicant: Elektromotive Ltd.).

First Examination Report Under Section 18(3) mailed by the U.K. Intellectual Property Office on Sep. 2, 2010 for U.K. Patent Application No. GB0711114.9, which was filed on Jun. 8, 2007 (Inventors: Taylor-Haw et al; Applicant: Elektromotive Ltd.).

Amended Claims mailed by Applicant on Apr. 4, 2011 for U.K. Patent Application No. GB0711114.9, which was filed on Jun. 8, 2007 (Inventors: Taylor-Haw et al; Applicant: Elektromotive Ltd.).

Second Examination Report Under Section 18(3) mailed by the U.K. Intellectual Property Office on Jun. 1, 2011 for U.K. Patent Application No. GB0711114.9, which was filed on Jun. 8, 2007 (Inventors: Taylor-Haw et al; Applicant: Elektromotive Ltd.).

Amended Claims mailed by Applicant on Jul. 13, 2011 for U.K. Patent Application No. GB0711114.9, which was filed on Jun. 8, 2007 (Inventors: Taylor-Haw et al; Applicant: Elektromotive Ltd.).

Certificate of Grant of Patent (GB2438979) issued by the U.K. Intellectual Property Office on Sep. 7, 2011 for U.K. Patent Application No. GB0711114.9, which was filed on Jun. 8, 2007 (Inventors: Taylor-Haw et al; Applicant: Elektromotive Ltd.)

Amended Claims mailed by Applicant on Jan. 13, 2009 for European Patent Application No. 07733141.1, which was filed on Jun. 8, 2007 and based on PCT/GB2007/002131 (Inventors: Taylor-Haw et al; Applicant: Elektromotive Ltd.).

International Preliminary Report on Patentability issued by the International Bureau on Dec. 10, 2008 for PCT/GB2007/002131, which was filed on Jun. 8, 2007 and published as WO 2007/141543 on Dec. 13, 2007 (Inventors: Taylor-Haw et al; Applicant: Elektromotive Ltd.).

DBT USA, "DBT and Paris lead EV charging infrastructure deployment," DBT press release, [undated reference], pp. 1.

DBT SA, "Bornes et Cofferrets de Recharge Pour Les Vehicules Electriques," DBT Technical manual, DBT SA, Parc Horizon 2000, 62117 Brebieres, Jan 2003, pp. 1-25.

* cited by examiner

ELECTRIC VEHICLE CHARGING STATION

CROSS-REFERENCE TO RELATED APPLICATIONS

The present application is a National Phase Application of International Application No. PCT/GB2007/002131, filed Jun. 8, 2007, which claims priority to Great Britain Patent Application No. 0611332.8 filed Jun. 8, 2006, which applications are incorporated herein fully by this reference.

FIELD OF THE INVENTION

The present invention relates to a charging station for recharging electric vehicles. The present invention also relates to a method of operating a charging station for recharging electric vehicles.

BACKGROUND TO THE INVENTION

Electric vehicles have been existence for over 100 years, one of the pioneering European vehicles was the "electric dog-cart" designed and built be Magnus Volk of Brighton England in 1887. Since then electric vehicles have come a long way in their overall design with many advances being made in motor and battery technology to improve their performance, efficiency and range. When compared to a conventional vehicle powered by an internal combustion engine, electric vehicles are much cleaner and friendlier to the environment, whilst reducing the running costs by as much as 90%. With all of these benefits over a conventional vehicle, electric vehicles still have one problem that has been in existence since their inception; that is the long time it takes to recharge their batteries.

To refuel a conventional liquid or gas powered vehicle takes a matter of minutes, an electric vehicle however may take hours depending upon the battery type and charger specifications. In addition to the long time taken to re-fuel, there is an even simpler problem that is inherent to electric vehicles, to recharge they need an electrical supply. In built up urban areas, such as cities and the like, vehicle owners may not have a defined private parking space with a power supply in situ. This is especially apparent with high density apartment style dwellings found in most major cities.

Whilst dedicated electric vehicle recharging bays are in themselves not new, there is a need to have a regulated power supply for recharging alternatively fuelled electric cars that is located at the road side much like a parking meter. This would allow an electric vehicle owner easy access to a power supply in order to recharge their vehicle whilst it is parked. Ideally, the power supply would be unobtrusive to its surroundings and compact enough to be located on the roadside pavement.

The present invention, at least in preferred embodiments, sets out to ameliorate or overcome at least some of the above problems.

SUMMARY OF THE INVENTION

Viewed from a first aspect, the present invention relates to a charging station operable in a charging cycle for charging an electric vehicle, the charging station comprising a key-activated controller for controlling the charging cycle. The controller should ideally enable the charging cycle only once it has been activated by a valid key. If the controller is not activated, the charging cycle may not be enabled and the charging station may not supply electricity. Thus, at least in preferred embodiments, improper use of the charging station can be prevented. The charging station can have one or more charging sockets.

The controller may comprise a mechanical lock activated by a conventional key, such as a metal key. Preferably, however, the controller comprises an electronic lock activated by an electronic key. The electronic key may comprise a magnetic swipe card, an electronic tag (such as an RFID tag), or a data storage device (such as ROM). The key may alternatively be understood to be a numerical or alphanumerical code input by a user, for example on a keypad or touch screen. The controller may be activated in response to biometric authentication provided by the key or directly by a user (for example by scanning a finger print). Of course, a combination of these different types of keys may be employed.

The charging station is preferably provided with a panel movable between an open position and a closed position. The panel may be slidably mounted but it is preferably pivotally mounted.

The panel preferably at least partially covers a charging socket when it is in the closed position. Thus, access to the charging socket is preferably restricted, and most preferably prevented, when the panel is in its closed position.

After the charging cycle has been enabled by the controller, it may be necessary to press a button or flick a switch to initiate the charging cycle. Preferably, however, the charging cycle is initiated when the panel is moved to its closed position. So, if the charging cycle is not also previously enabled by the controller, the charging cycle may not be initiated.

The charging cycle is preferably stopped when the panel is moved to said open position. This arrangement provides additional safety by ensuring that the charging socket is not live when the panel is open.

A locking mechanism for locking the panel in said closed position is preferably provided. The locking mechanism is preferably controlled by said controller. Thus, activating the controller with a key may both unlock the locking mechanism to allow the panel to be moved to its open position and enable the charging cycle.

In use, a plug located in the charging socket is preferably locked in position by the panel when it is locked in its closed position. This prevents the plug being removed by someone not having a key to activate the controller.

Preferably, once a charging cycle has been initiated, the locking mechanism can only be opened by a service key or the same key used to activate the controller to enable the ongoing charging cycle to be initiated. Thus, another user cannot unlock the panel once a charging cycle has been initiated. This feature is believed to be patentable independently. The service key would be used by service or maintenance personnel to service or maintain the charging station.

In addition to providing a key, a user may have to input a code to activate the controller. However, the activation of the controller is preferably performed automatically when a valid key is used.

The charging station may be provided with a transmitter for transmitting a signal to a transponder or a Radio Frequency Identification (RFID) tag. The charging station may be provided with a receiver for receiving a signal transmitted from a transponder or Radio Frequency Identification (RFID) tag.

Thus, the charging station may interrogate a transponder or Radio Frequency Identification (RFID) tag to obtain user information, such as account details, to activate the controller automatically. The charging station preferably comprises a processor for processing data received from a transponder or Radio Frequency Identification (RFID) tag. The key to activate the controller preferably comprises a transponder or Radio Frequency Identification (RFID) tag to provide data to the charging station.

The charging station is preferably provided with a display, such as an LCD display. The display typically displays data received from the key, such as a registration number of the vehicle being charged. The display typically also displays information relating to the charging cycle. For example, the display may display the period of time that vehicle has been charging and/or the charged state of the vehicle's battery (for example as a percentage).

The charging station may be a stand-alone unit. Preferably, however, the charging station can be connected to a data network. The charging station preferably comprises an interface to enable the charging station to be connected to the data network. The charging station may send and/or receive data over the network. The data may comprise one or more of, but is not limited to, the following: (i) customer identification data; (ii) customer account data, such as the credit that the customer currently has in an account; (iii) the start time and end time that the charging station was used by a customer; (iv) the period of time that the charging station was used by a customer; (v) the date; (vi) the total electricity consumed during a charging cycle; and/or (vii) vehicle registration details. The data typically enables a financial charge to be made to an individual for using the charging station.

The charging station may be provided with processing means for receiving payment for performing the charging cycle. The processing means may process a credit or debit card payment; or a payment from a mobile phone, for example via receipt of a text message. The key-activated controller and the processing means may be combined such that receipt of the appropriate payment activates the controller to enable the charging cycle.

The interface may provide a physical connection to the data network but it is preferably wireless.

Viewed from another aspect, the present invention further relates to a plurality of charging stations linked to a central processor over a data network. The charging stations may exchange data, such as account data, with the central processor over the data network to enable financial charges to be made to customers for using the charging stations.

Viewed from a further aspect, the present invention relates to a key for a charging station as described herein. The key preferably comprises a transponder or Radio Frequency Identification (RFID) tag for transmitting data to the charging station. The transponder or Radio Frequency Identification (RFID) tag may, for example, store data relating to a user account and/or a vehicle registration details. This data may be transmitted to the charging station upon receipt of an appropriate signal from the charging station. The transponder or Radio Frequency Identification (RFID) tag may be passive or active. The key may be integrated with a vehicle key.

Viewed from a further aspect, the present invention relates to a charging station operable in a charging cycle for charging an electric vehicle, the charging station comprising a panel movable between an open position and a closed position; wherein the charging cycle is initiated when the panel is moved to said closed position. The charging cycle is preferably stopped when the panel is moved to said open position. The panel preferably at least partially covers a charging socket provided in the charging station. Access to the charging socket is preferably restricted or prevented when the panel is in said closed position.

Viewed from a still further aspect, the present invention relates to a charging station for charging an electric vehicle, the charging station comprising an interface for connecting the charging station to a data network. In use, the charging station communicates with a remote processor over said data network. The interface allows data to be sent to and/or received from the remote processor. The interface is preferably wireless.

Viewed from a yet further aspect, the present invention relates to a charging station for charging a vehicle, the charging station comprising an indicator for emitting visible light in two or more different colours to indicate the status of the charging station. At least in preferred embodiments, the charging station provides a clear visible indication of its status. A prospective user may determine the status of the charging station while they are still in their vehicle, thereby avoiding the frustration of parking at a charging station which is already in use or is out of order. The colour of the visible light emitted from the indicator is representative of a predetermined status of the charging station.

In a preferred embodiment, the indicator is capable of emitting light in three different colours.

For example, the indicator may emit light of a first colour to indicate that the charging station is out of order. The indicator may emit light of a second colour to indicate that the charging station is operational. The indicator may emit light of a third colour to indicate that the charging station is charging. The first, second and third colours are preferably three different colours to allow the status of the charging station to be readily determined. In a preferred embodiment, the first colour is red, the second colour is blue, and the third colour is green. Of course, different colours may be used to represent the different conditions of the charging station.

The indicator is preferably ring-shaped. Most preferably, the indicator extends around the circumference of the charging station. This is desirable since it enables the status of the charging post to be determined from a wide range of angles.

The indicator preferably comprises at least one light source. The at least one light source may be a light emitting diode, a bulb, a lamp or any other light emitting device.

The indicator preferably comprises a plurality of light sources. The light sources may, for example, be red, green and blue and the intensity of the different coloured light sources varied to change the colour of light emitted from the indicator. Alternatively, light sources of different colours may be provided for indicating the status of the charging station.

The number of light sources illuminated may be varied in response to changes in the status of the charging station. For example, the number of light sources illuminated may be varied to provide an indication of the progress of a charging cycle.

The intensity of the light emitted from the indicator may be varied in response to changes in the status of the charging station. For example, the intensity of the indicator may be varied to provide an indication of the progress of a charging cycle.

Viewed from a further aspect, the present invention may relate to a charging station for charging a vehicle, the charging station comprising a socket for receiving a plug and a key-operated locking mechanism for locking a plug in said socket. Thus, the plug cannot be removed from the socket without unlocking the locking mechanism.

The locking mechanism is preferably operated by an electronic key. The electronic key is preferably wireless.

Most preferably, the locking mechanism can only be opened by a service key or the same key as used to lock it. Thus, the plug cannot be removed from the charging station. The service key enables servicing or maintenance of the charging station.

A charging cycle may be initiated by pressing a button, flicking a switch or entering an identification code. Preferably, however, the charging cycle is initiated when the locking mechanism is locked. The charging station may perform a test to determine if a plug is located in the socket. The charging cycle may be initiated only if a plug is detected; or, if no plug is detected, the charging cycle may be terminated.

The locking mechanism may comprise a bracket or other member which extends over a plug located in the socket. Preferably, the charging station comprises a panel movable between an open position and a closed position. The locking mechanism preferably locks the panel in said closed position. When the panel is in its closed position, it preferably at least partially covers the plug located in said socket.

The panel preferably forms a seal around at least a portion of the socket when it is in said closed position. This seal helps to weatherproof the charging station.

The panel may be slidably or pivotally mounted on the charging station. Preferably, the panel is hingedly mounted.

It is envisaged that individuals may attempt to use the charging station improperly. Although in preferred embodiments a key is required to enable a charging cycle, it is envisaged that individuals may attempt to use the charging station by forcibly removing the panel which at least partially covers the charging socket. To reduce the likelihood of the charging station itself being damaged in these circumstances, the panel is preferably frangible. Thus, at least in preferred embodiments, the panel breaks off without transferring excessive forces to the charging station. The panel may, for example, be provided with a line of weakness. Alternatively or in addition, the locking mechanism may be predisposed to fail or break without transferring excessive forces to the charging station.

Viewed from a yet further aspect, the present invention relates to a charging station for charging a vehicle, the charging station comprising a socket for receiving a plug and a panel movable between an open position and a closed position, wherein the panel is frangible. The panel is preferably provided with a line of weakness. The panel preferably at least partially covers the socket when it is in said closed position.

Preferably, the panel forms a seal around at least a portion of the socket when the panel is in said closed position.

A locking mechanism may be provided for locking said panel in said closed position. The locking mechanism is preferably key-operated.

Viewed from a further aspect, the present invention relates to a charging station for a vehicle comprising a socket for receiving a plug to charge a vehicle, wherein the socket is replaceable to allow different types of socket to be installed. This modular design facilitates installation of the charging station in different countries having different electricity sockets.

The charging stations described herein may, for example, form part of a piece of street furniture (such as a street lamp or parking meter) or be incorporated into a building. Preferably, the charging station is a dedicated pillar. Of course, the charging station may provide additional functionality, such as acting as a parking meter.

Viewed from a yet further aspect, the present invention relates to a charging station operable in a charging cycle for charging an electric vehicle, the charging station comprising at least one charging socket and a processor for generating data to impose a financial charge on an individual for using the charging station.

The processor may, in use, generate data comprising (i) the start time and end time that the charging station was used by a customer; and/or (ii) the period of time that the charging station was used by a customer; and/or (iii) the total electricity consumed during a charging cycle.

The charging station may also be provided with an interface to connect the processor to a data network. The generated data may be transmitted over the data network to allow a user to be charged financially for using the charging station.

The charging station may be combined with a parking meter. A user may pay for both parking and charging an electric vehicle simultaneously.

Viewed from a yet still further aspect, the present invention relates to a method of operating a charging station for an electric vehicle, the method comprising the steps of:
(i) obtaining user identification data;
(ii) supplying electricity to a charging socket; and
(iii) generating data for levying a financial charge on the user.

The user identification data may comprise customer account data and/or vehicle registration details.

The method may further comprise the step of transmitting the identification data and/or the generated data to a remote processor.

The step of generating data may comprise generating data relating to:
(i) the start time and end time that the vehicle was connected to the charging station; and/or
(ii) the period of time that the charging station was used by a customer; and/or
(iii) the total electricity consumed during a charging cycle.

The method may comprise the further step of checking if the account data for the user identified by said identification data satisfies one or more rules. Electricity would be supplied to the charging socket only if the account data satisfies said rule or rules. The account data typically comprises an indication of the state of the user's account and the account data may only be required to satisfy the rule that the account is in credit. A further rule may, for example, require that the account is in credit by a pre-determined amount.

The financial charge levied on the user may be both for charging their vehicle and also parking the vehicle in a parking bay associated with the charging station. Thus, the charging station may also act as a parking meter.

To provide increased functionality, the charging station may operate as a parking meter without supplying electricity to charge a vehicle. Thus, a financial charge may be made solely for parking.

Viewed from a further aspect, the present invention relates to a method of operating a charging station for an electric vehicle, the method comprising the steps of:
(i) obtaining user identification data;
(ii) checking to determine if account data relating to the user identified by said identification data satisfies one or more rules; and
(iii) either temporarily disabling the charging station if the account data does not satisfy said rule or rules; or supplying electricity to a charging socket if the account data satisfies said rule or rules.

The method may comprise the further step of generating data for levying a financial charge on the user.

Viewed from a still further aspect, the present invention provides a recharging unit that comprises an electrical connector to which the electric vehicle can be connected to, a microprocessor to control all of the specific functions of the unit, an active display and or light to advise the user of the functional state of the unit, a method to access and control the unit and a device to connect the unit to a network of other units and a control computer.

In the preferred embodiment the unit would be activated by a user wishing to recharge their EV, the activation can be via several means including but not limited to a conventional key, RFID tag, swipe card, barcode or code entered via keypad. The key or code used to activate the unit would be verified for validity. If the key or code is valid the user will be able to connect their vehicle and commence recharging. If the key or code is invalid then the unit will not supply power. The electric vehicle may be able to be connected to the unit either before or after validation. Upon successful validation and connection, the unit would then supply power to the EV. To end a recharging session the user would use their key or code to deactivate the unit and cut the supply of power at which point the electric vehicle can be safely disconnected from the unit.

The term "key" used herein is to be interpreted broadly as referring to any means of access. As such, the term covers physical and electronic keys as wells as numerical and alphanumerical codes.

BRIEF DESCRIPTION OF THE DRAWINGS

A preferred embodiment of the present invention will now be described, by way of example only, with reference to the accompanying figures, in which.

DETAILED DESCRIPTION OF THE PREFERRED EMBODIMENT

Figure 1:
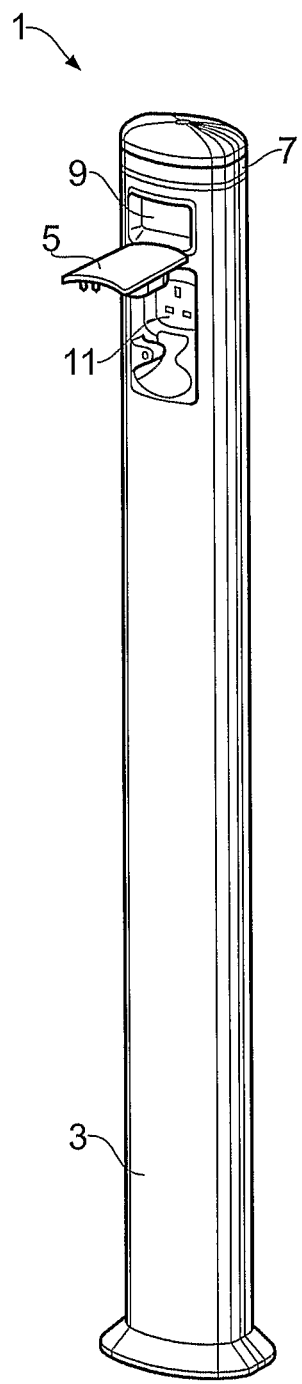
FIG. 1 shows a perspective view of a charging station in accordance with a preferred embodiment of the present invention.

A perspective view of a charging station 1 in accordance with a first embodiment of the present invention is shown in FIG. 1. The charging station 1 is intended for charging an electric vehicle and may be referred to as a vehicle charging station. The charging station 1 comprises a housing 3, an access panel 5, an indicator 7 and an LCD display 9. A charging socket 11 is provided in the front of the charging station 1.

The access panel 5 is hingedly mounted on the housing 3 and is movable between an open position and a closed position. The access panel 5 covers the charging socket 11 when it is closed. When closed, the access panel 5 also covers a plug located in the socket 11 and prevents the plug from being removed.

A locking mechanism is provided for locking the access panel 5 in its closed position. The locking mechanism is controlled by a processor 13 connected to a dedicated Radio Frequency Identification (RFID) processor 14. The processor 13 is provided with a data storage module.

Figure 2:
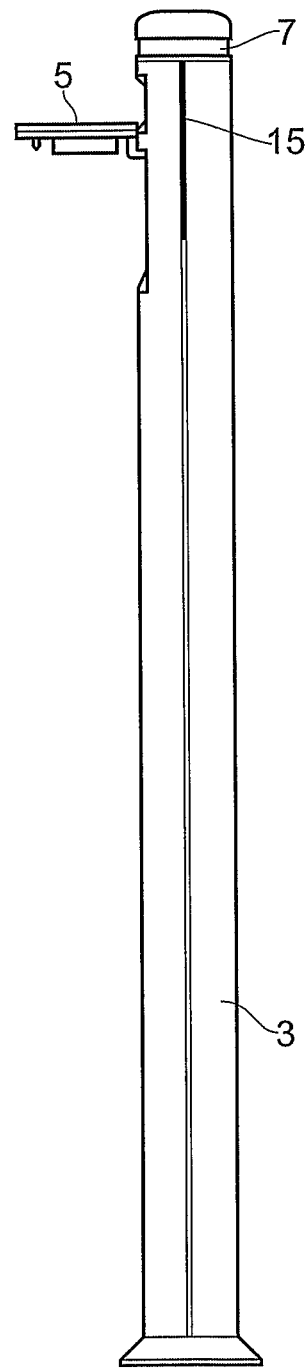
FIG. 2 shows a side view of the charging station of FIG. 1.

The RFID processor 14 is connected to a transmitter and receiver for interrogating an external RFID tag (not shown), typically provided in an electronic key. An antenna (not shown) is provided for the transmitter and receiver. The housing 3 is a single-piece metal extrusion and, as shown in FIG. 2, a slot 15 is formed in the side of the housing 3 proximal the antenna to increase the effective range over which an RFID tag may be interrogated.

Figure 3:
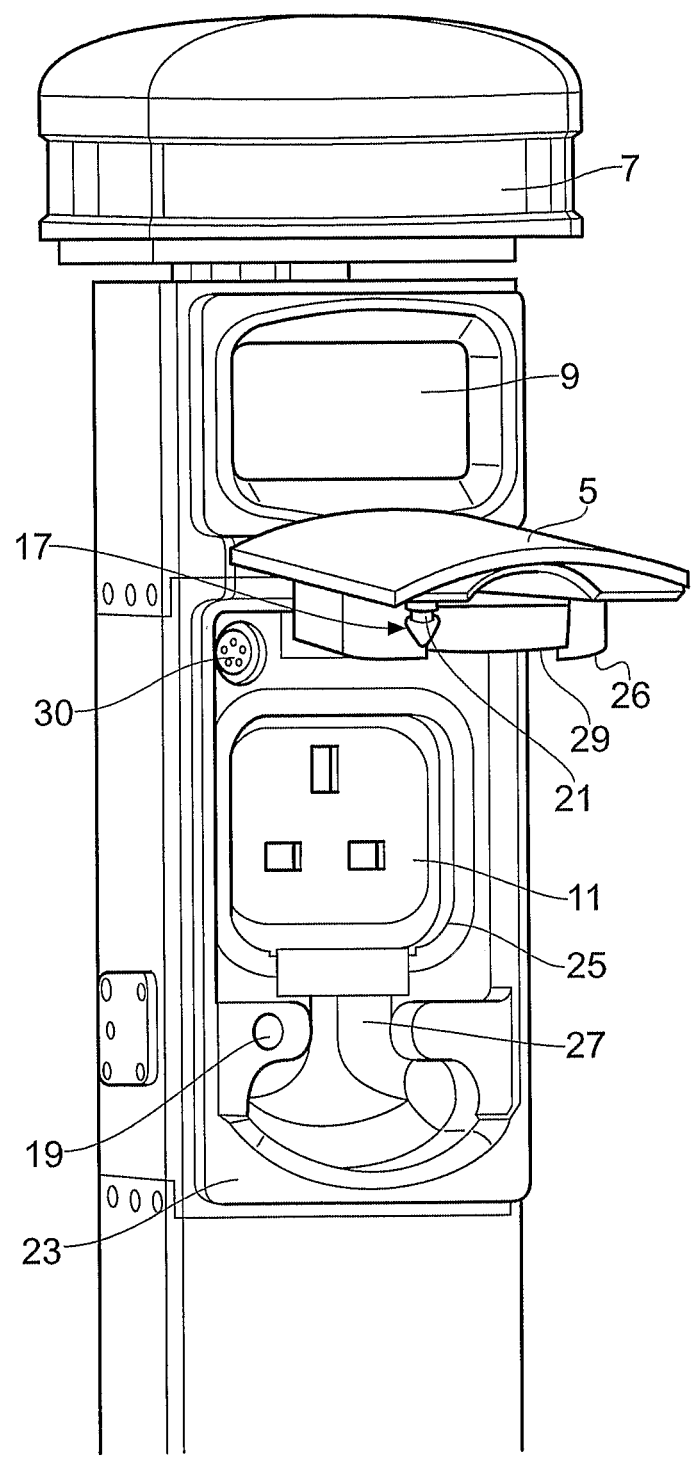
FIG. 3 shows an enlarged perspective view of the front of the charging station.

An enlarged perspective view of the front of the charging station 1 is shown in FIG. 3 with the housing 3 omitted. The access panel 5 is provided with a locking pin 17 which locates in an aperture 19 provided in the housing 3 when the access panel 5 is closed. An annular recess 21 is provided around the circumference of the locking pin 17 for cooperating with the locking mechanism. The locking pin 17 optionally has a shear point to allow the pin 17 to shear or deform if an attempt is made to forcibly open the access panel 5. The shearing of the locking pin 17 helps to prevent damage to the remainder of the charging station 1.

The indicator 7 comprises a series of lamps for illuminating the indicator 7. The indicator 7 can selectively be illuminated red, green or blue to indicate the status of the charging station 1. The indicator 7 is red if the charging station 1 is out of order; is blue if the charging station 1 is ready to be used; or green if the charging station 1 is charging an electric vehicle. A top cap is provided on top of the indicator 7 to protect it from damage.

The charging socket 11 is mounted in a casing 23 provided at the top of the charging station. The access panel 3 is mounted on the casing 23 and covers the charging socket 11 when it is moved to its closed position. Access to the charging socket 11 is restricted when the access panel 3 is closed. A recess 25 is provided in the casing 23 around the charging socket 11 to receive a projecting wall 26 provided on the inside of the access panel 3. The charging socket 11 is fitted into the recess 25. The recess 25 and the projecting wall 26 help to prevent the ingress of water into the charging socket 11 when the access panel 3 is closed. A sealing ring (not shown) may also be provided around the charging socket 11.

First and second flexible sealing strips 27, 29 are provided on the casing 23 and the access panel 3 respectively. The sealing strips 27, 29 locate around the cable (not shown) connecting the plug to the electric vehicle to help prevent the ingress of water.

A digital communication access port 30 is provided in the casing 23. The port 30 enables a link to be established to the processor 13, for example to download information from the processor 13 or to run diagnostic procedures.

The charging socket 11 illustrated in FIG. 3 is a conventional three-pin socket for use in the United Kingdom. The charging socket 11 is a modular component which may readily be replaced with a different type of socket to enable the charging station 1 to be used in other territories.

Figure 4:
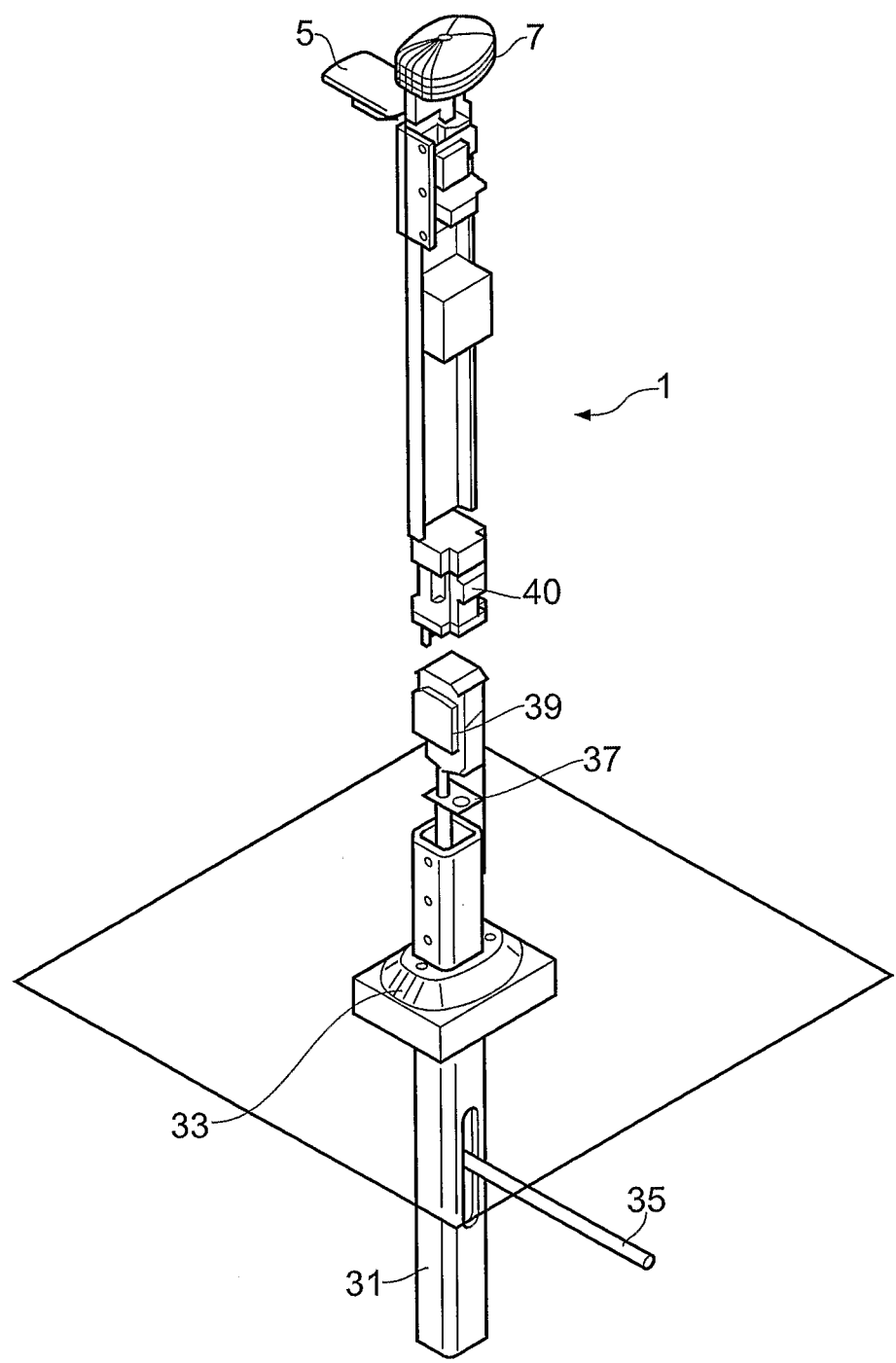
FIG. 4 shows a perspective view of the back of the charging station.

A perspective view of the back of the charging station 1 is shown in FIG. 4 with the housing 3 omitted. A foundation post 31 extends below ground level to mount the charging station 1. A base unit 33 is mounted on the foundation post 31 at ground level. The housing 3 is mounted on the base unit 33. A power cable 35 is provided underground and enters the foundation post 31 to supply power to the charging station 1. The power cable 35 supplies electricity at 240 VAC, 50-60 HZ and up to 20 Amps.

The power cable 35 is connected to a cable gland 37 provided in the housing 3. A street light cut out 39 and a circuit breaker and RDC device 40 with automatic reset are also provided in the housing 3, as shown in FIG. 4.

Figure 5:
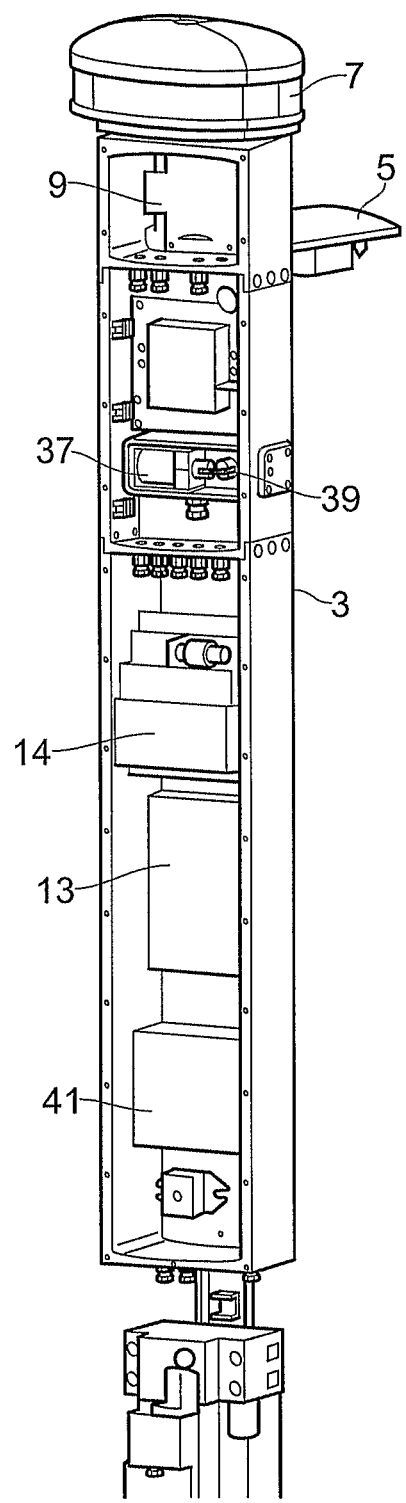
FIG. 5 shows an enlarged perspective view of the top of the charging station.

An enlarged perspective view of the back of the charging station 1 is shown in FIG. 5. The locking mechanism comprises a solenoid 37 for actuating a locking member 39. The locking member 39 engages the locking pin 17 to lock the access panel in its closed position.

Figure 6:
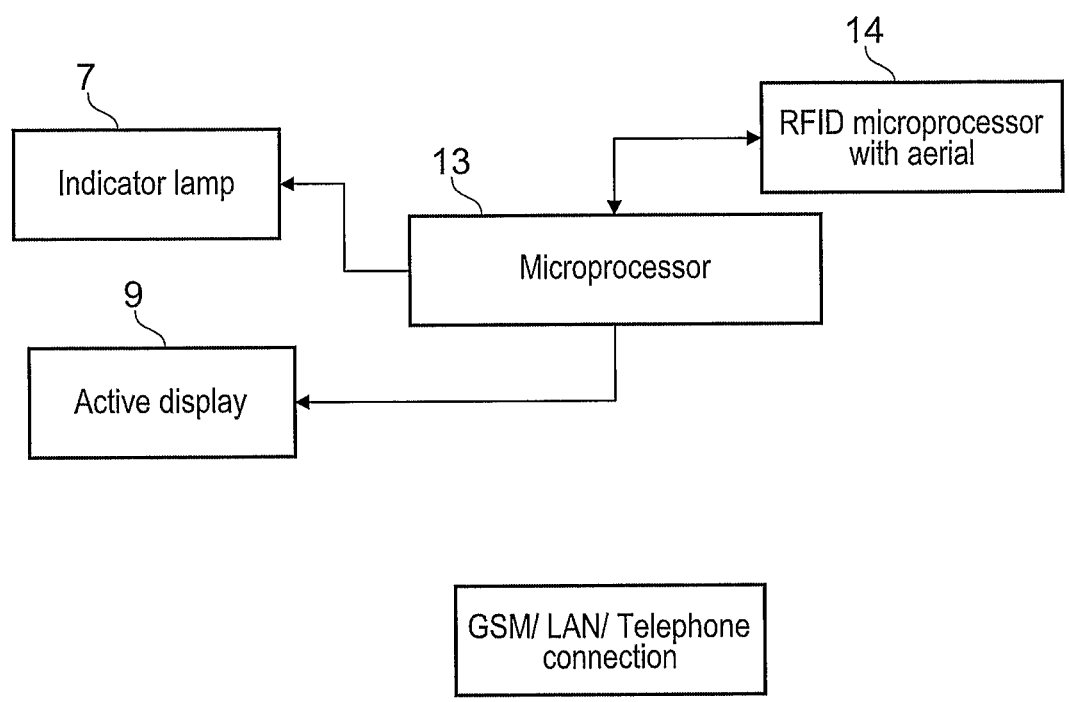
FIG. 6 shows a flow chart representing the connection of the processor in the charging station according to a preferred embodiment of the present invention.

As shown in FIG. 6, the processor 13 is connected to the indicator 7, the display 9 and the RFID processor 14. The processor 13 is connected to a data network via an interface 41. The interface 41 typically enables communication over the data network via Global System for Mobile Communications (GSM), Local Area Network (LAN) or telephone connection. The interface 41 in the present embodiment is a GSM module.

Figure 7:
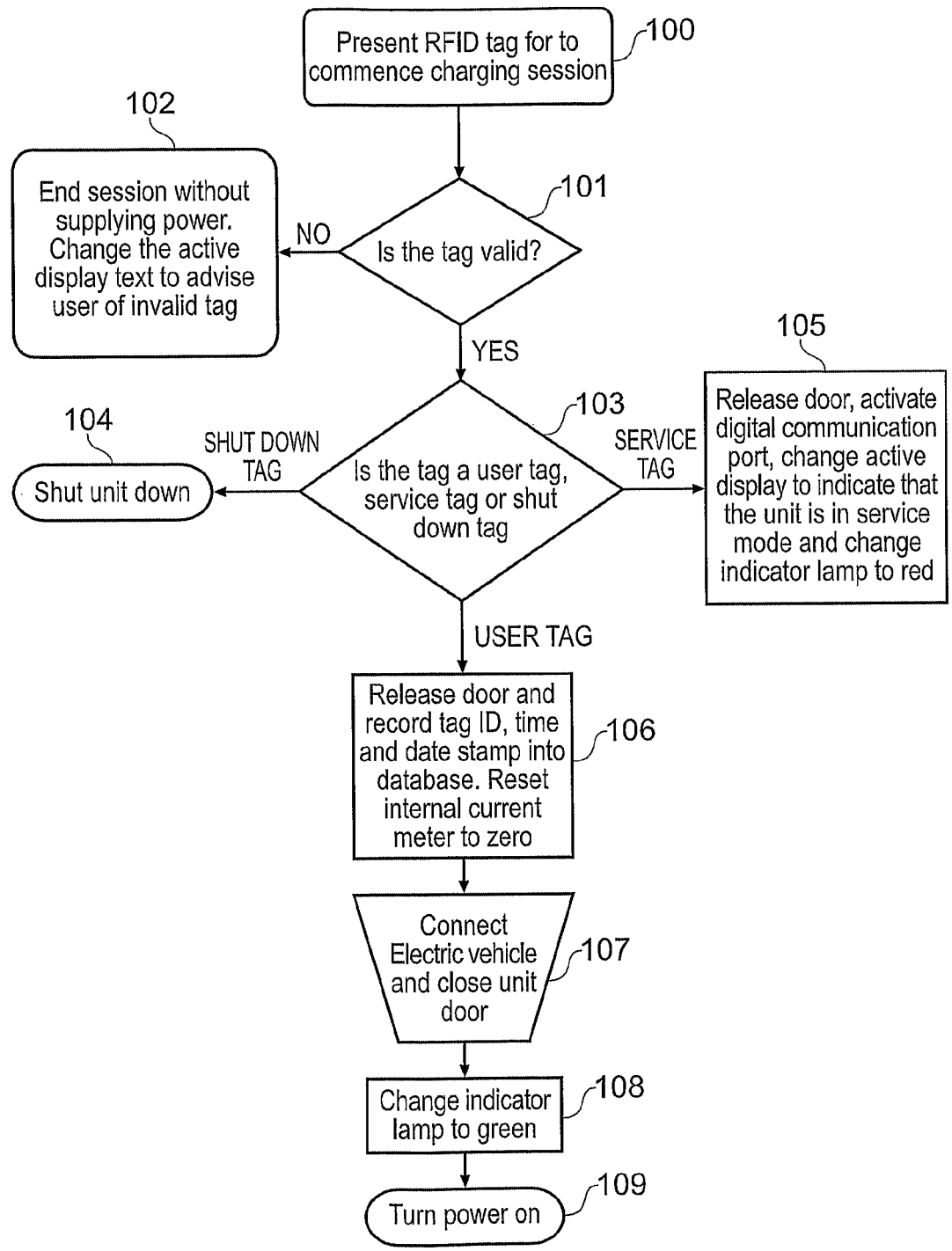
FIG. 7 shows a flow chart illustrating the steps process for initiating a charging cycle in accordance with the present invention.

The initiation of a charging cycle using the charging station 1 will now be described with reference to the flow chart shown in FIG. 7.

A user presents their key containing an RFID tag to the charging station 1 (step 100). A signal transmitted from the transmitter in the charging station 1 triggers a return signal from the RFID tag. The return signal is detected by the receiver in the charging station 1 and the RFID processor 14 determines whether the RFID tag is valid (step 101). If the RFID tag is not valid, the session is terminated (step 102). If the RFID tag is valid, the RFID processor 14 determines whether it is a user tag, a service tag or a shut down tag (step 103).

If the RFID tag is a shut down tag, the charging station 1 is shut down (step 104). This type of RFID tag may, for example, be used if essential maintenance is to be performed on the charging station 1.

If the RFID tag is a service tag, the charging station 1 releases the access panel 5 and the digital communication port 30 is enabled (step 105). The display 9 is changed to indicate that the charging station is in service mode and the colour of the indicator 7 changed to red to show that the charging station 1 is not in service. The required servicing may then be performed on the charging station 1.

If the RFID tag is a user tag, the access panel 5 is opened and identification data from the RFID tag recorded (step 106). The time and date are recorded and an internal charging meter reset. The vehicle registration details are typically retrieved from the RFID tag and this information may, optionally, be displayed on the display 9. The charging cycle is enabled by the processor 13. The user then plugs a plug into the charging socket 11 to connect the electric vehicle to the charging station 1 and closes the access panel 5 (step 107). The processor 13 activates the locking mechanism to lock the access panel 5 in its closed position. The processor 13 changes the colour of the indicator 7 to green (step 108) to show that the charging station 1 is charging. Finally, the charging cycle is initiated and current is supplied to the electric vehicle (step 109).

Figure 8:
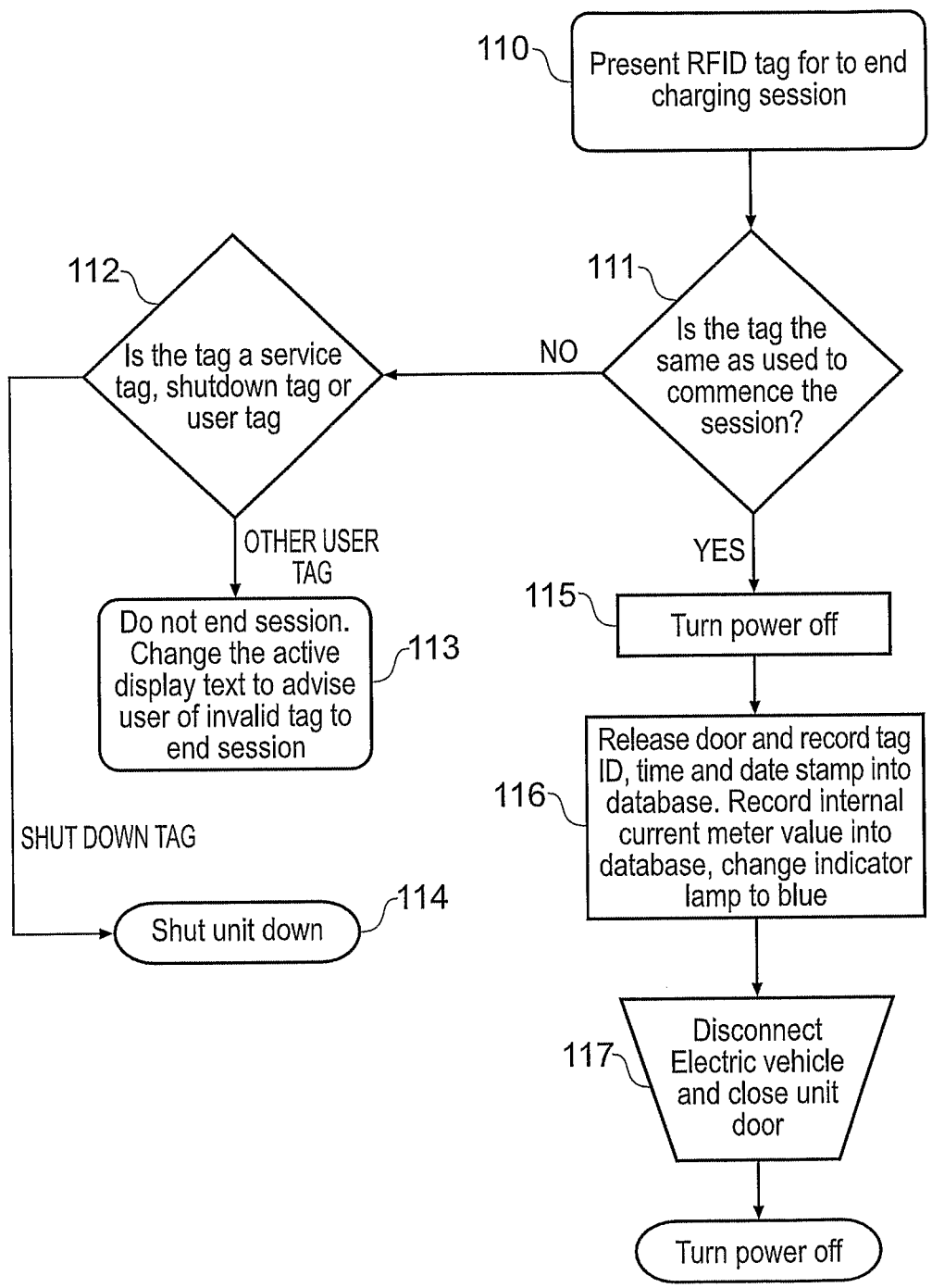
FIG. 8 shows a flow chart illustrating the steps for terminating a charging cycle in accordance with the present invention

The termination of a charging cycle using the charging station 1 will now be described with reference to the flow chart shown in FIG. 8.

The user returns to the charging station 1 after a period of time has elapsed and presents their key to end the charging cycle (step 110). The RFID tag is detected and the RFID processor 14 checks (step 111) to determine if it is the same RFID tag used to commence the charging cycle.

If the RFID tag is not the same tag used to commence the charging cycle, the RFID processor 14 checks whether the RFID tag is a service tag, a shutdown tag or another user tag (step 112). If the detected RFID tag is a service tag, the charging station 1 enters a service cycle and the display 9 is updated accordingly. If the detected RFID tag is another user tag, different from the RFID tag used to initiate the charging cycle, the display 9 displays a message indicating that the user tag is not valid for ending the session and the charging cycle continues (step 113). If the detected RFID tag is a shutdown tag, the charging station 1 is shutdown (step 114).

If the detected RFID tag is the same RFID tag as the one used to initiate the charging cycle, the supply of electricity to the charging socket 11 is terminated (step 115). The access panel 5 is then unlocked to allow the plug to be removed from the charging socket 11 and the processor 13 records the tag identification, time and date along with the internal current meter value (step 116). The colour of the indicator 7 is then changed to blue to indicate that the charging station 1 is available for use.

The user then disconnects the vehicle from the charging station 1 and closes the access panel (step 117).

The use of the charging station 1 in accordance with the present invention will now be described in more general terms.

To access and use the invention in the preferred embodiment a user would first of all locate a vacant working charging station 1 that is easily recognisable at a distance by the indicator 7. This light preferably has the ability to change to any colour of the visible spectrum. If the unit is ready to supply power the light will glow blue. If the unit is busy charging an electric vehicle the light will be green in colour and if the unit has a fault or is unavailable to use the light will be red.

Once a vacant working unit has been located the user presents their RFID tag to the RFID antenna so that this unit can interrogate the RFID tag and verify if it is valid. If the RFID tag is invalid the charging station 1 will not activate and a message will be displayed on the display 9 to advise the user that the RFID tag is invalid. In addition, the indicator 7 may momentarily change colour to alert the user that the tag is invalid.

When the charging station 1 has verified that the RFID tag is valid the charging station 1 then checks to see whether the RFID tag is one of three types. The first being a shut down tag the second being a service tag and the third being a general user tag to activate the unit. If the RFID tag is a shut down tag then the unit will cut the power supply to the charging station. If a service tag is interrogated then the electrical connector access panel 5 will be mechanically released exposing the charging socket 11 and digital communication line connector 30. The access panel 5 is released by a solenoid 37 however it is possible to use any number of alternative methods to release the door.

The digital communication line 30 can be electronically incorporated into the charging socket 11, however in this preferred embodiment the digital communications line 30 is separate. It should be noted that this communication line 30 may not be a physical connection, the communication may take place wirelessly via RF, GSM or optical link. The digital communications line 30 is covered by a plug to prevent ingress and un-authorised use. When in service mode this communications line 30 is activated allowing the charging station 1 to be connected to an external device for maintenance and reprogramming. If the charging station 1 is not connected to an external device in or for a defined period of time the charging station 1 will time out and reset to a ready blue state with the communication line 30 disabled and no power being supplied to the charging socket 11. The charging station 1 will reset whether or not the access panel 5 has been closed. If the access panel 5 is closed prior to the time out, the charging station 1 will reset back to its ready to use state and the indicator 7 will change to a blue colour.

If the charging station 1 interrogates a valid general user RFID tag the charging station 1 will commence a charging cycle by releasing the access panel 5 and changing the information on the display 9, this may include a welcome note and prompt for the user to insert the plug and close the access panel 5. If the access panel 5 is not closed on the charging station 1 at this point then the power will not be switched on. In addition, if the access panel 5 is not closed in a defined period of time then the charging station 1 will time-out and reset to the ready blue state.

It should be noted that alternatives of the overall design may not include an access panel 5. In this instance the charging station 1 would sense that the charging socket 11 is engaged or disengaged. Of course, embodiments having an access panel 5 may also detect if the charging socket 11 is in use. To prevent the electrical connection being made whilst the charging socket 11 is live the unit will not supply power until the connection is made. Alternatively if the connector is removed before the charging cycle has ended then the charging station 1 will immediately cut the power from to the charging socket 11.

Once the access panel 5 is closed, power to the charging socket 11 is switched on, the indicator 7 changes to green and the display 9 changes to indicate charging.

At least in preferred embodiments, all of this operation can be performed without the user pressing a single button. The only trigger for the charging station 1 to operate has been a successful read of a valid RFID tag. Each RFID tag is manufactured with a unique ID. The RFID tags may also store additional information. The RFID tags can be programmed such that the users name, valid from & valid to date stamp, car registration number and the like can all be stored on the RFID tag. The charging station is also able to write and delete certain information on the tags. Information that would need to be written to the tags can include total times for using the units and total power supplied.

To end a recharging cycle, the user would once again present the RFID tag to the charging station 1 for interrogation. If the RFID tag is the same general user tag then the unit will cut the power to the charging socket 11, change the colour of the indicator 7, prompt the user to remove their electric vehicle from the charging socket 11 and close the access panel 5.

If the RFID tag presented is a general user tag and not the tag that started the session then the charging station 1 will not cut the power and the access panel 5 will not be released. The display 9 will however change to advise the user that they cannot access the charging station as another tag was used to start the recharging session.

In order to monitor the usage of the system the unit contains a data storage facility that is accessible to the microprocessor 13. When a user commences a recharging session the unit stores information about the session. Data such as the time, date and any of the information contained on the tag can be stored. At the end of a recharging session the charging station 1 records how long the session was and how much power has been consumed in the process. By storing this information the usage can be monitored and used for many different purposes including but not limited to issuing charges for the power consumed and monitoring usage patterns.

As already mentioned the charging stations will typically be placed beside a parking space to enable electric vehicle users easy access for recharging their vehicle. To ensure that the charging station 1 and parking space is not being constantly used by one single user the unit can be programmed to limit the time that each charging session will last. A time can be shown on the display 9 to show the remaining time that the electric vehicle will be on charge for and at the end of this time the unit will cut off the power, but not open the access panel 5. This allows the charging station 1 to be used as a combined electric vehicle re-fuelling point and a parking meter. If a recharging session has exceeded the prescribed length then the charging station 1 will indicate this on the display 9 and the indicator 7 will change colour. This would indicate to a parking inspector that the vehicle has been parked for too long and a fine can be served.

Alternatively the information stored in the data base can be used to do the same as a parking attendant serving a parking fine. If a charging session has not been ended by the user before the end of the prescribed recharging cycle period a record of the time overstayed, tag ID, time and date is stored in the charging station 1 and can then be used to automatically serve a parking infringement penalty notice.

By displaying the vehicle registration number a parking attendant can also monitor the correct usage of the tags. If the unit displays the vehicle registration number on the active display whilst charging a parking inspector can check to see if this is the corresponds to the vehicle that is currently being recharged. If the registration number on the vehicle is different to that displayed on the display 9 then this would indicate an incorrect tag, not registered to the vehicle was used to access the unit.

The RFID tags can also be programmed to use a digital token to access the charging station 1. In this mode a finite number of digital tokens can stored on to the RFID tag, when a user accesses a unit to recharge their electric vehicle upon ending the session the charging station 1 then removes the number of tokens off the tag as payment for the power provided. This allows users of the charging station 1 to pay as they go and get their RFID tag topped up with further tokens much like a pay as you go mobile phone. This is particularly advantageous as the charging station 1 can be programmed to function with other commuter electronic RFID based tickets such as the Oyster Card system used on the London Underground. A commuter would be able to use their Oyster card to access the charging station 1, payment for the power used would be taken via the Oyster Card, or any other RFID payment system.

The charging stations 1 also contain a GSM module to communicate with an external computer, this computer link is not limited to GSM and can be any form of digital communications over a conventional phone line, dedicated network, optical and the like. This link allows the unit to communicate with another computer or device for many different functions. These can include checking to see if an RFID tag is valid, updating the site firmware, downloading stored user data and event to indicate the physical state of the unit. The microprocessor controlling the charging station 1 can monitor the performance of the other internal components. If a component begins to fail or fails completely, the unit can communicate to an external computer via the GSM module to notify it of the failure.

The GSM module also has another function that is to allow people access to use the site via a premium rate text message. This unit can display the GMS number on the active display, if a user sends a text to the number shown on the unit the user will be charged for the power that they use to their mobile phone. In this situation it would allow for future access to the system without the need for keys or tags.

As the GSM number is displayed on the charging station 1, to prevent any unauthorised persons attempting to connect another computer or device to the charging station 1 via the GSM link a simple security procedure is utilised. Whilst the charging station 1 can receive a text message from any source, the charging station 1 has stored within it a record of phone numbers that it is only allowed to receive incoming calls from. To communicate with the GSM module a user needs to call it much like dial up internet access, the incoming caller phone number has to match that stored in the unit or the GSM module will not receive the call.

Alternatively this feature to communicate with another computer via GSM or any other communication method can be used to flag vandalism or inappropriate use of the unit. For the unit to function it follows a logical sequence of events. The sequence for commencing a recharging session of a preferred embodiment of the present invention is shown in FIG. 7. If the access panel 5 has been forced open without a tag being read then the charging station 1 can notify an external computer of this access via the GSM module. In addition to this other sensors may be fitted into the charging station 1 to detect if the charging station 1 is being disassembled. Accelerometers or tilt sensors can be used to measure if a vehicle has hit the unit and it is now no longer in a vertical state.

This ability to communicate to an external computer will facilitate the maintenance of a system consisting of multiple charging stations 1. Each charging station 1 will be able to communicate to an external computer or directly with other charging stations 1. When considering maintenance alone, as soon as a charging station 1 has a technical problem it can contact another computer to flag the fault and a maintenance report generated automatically. This detailed report of the charging station 1, fault and remedial action needed, can then be used to efficiently have the charging station 1 scheduled for repair.

As the charging station 1 essentially locks the access panel 5 to the charging socket 11 during a recharging session, in the event of a power failure it is advantageous that the access panel 5 is released and the locking mechanism is disabled until the power to the unit is restored. This feature will allow the user to disconnect their electric vehicle if there is a power failure. Alternatively if the charging station 1 itself becomes unserviceable whist in a recharging session the access panel 5 will be released, power cut from the charging socket 11 and the locking mechanism disabled to prevent the access panel 5 locking.

Whilst the preferred embodiment encompasses one charging station 1 controlling the access and functionality of one charging socket 11 in the future it may be desirable to have multiple charging sockets on a single charging station 1 to allow several electric vehicles to be recharged from the charging station 1 simultaneously. The recharging status of each electric vehicle would be displayed on the display 9.

The information on the display 9 is not limited to the specific functionality of the charging station 1. Other information including general advertising, maps, video and even internet access can be displayed on the unit. This would turn the charging station 1 into a multimedia access point at street level. The charging station 1 could incorporate speakers for audio output and/or a wireless, 3 G or GPRS internet connection to allow users to access the internet.

A preferred embodiment of the charging station 1 may also enable electronic or digital communication with the vehicle being charged. For example, the charging station 1 may be capable of serial communication over the electrical wires supplying power for recharging; serial communication over additional wires connected to the vehicle that do not supplied power for recharging the vehicle and/or by wireless communication.

It will be appreciated that various changes and modifications may be made with departing from the spirit or scope of the present invention.

The invention claimed is:

1. A charging station operable in a charging cycle for charging an electric vehicle, the charging station comprising a controller for controlling the charging cycle activated by an electronic user key, a panel movable between an open position and a closed position, a locking mechanism controlled by the controller for locking the panel in the closed position, and a socket for receiving a plug, wherein the charging cycle is initiated when the panel is moved to the closed position, wherein, once a charging cycle has been initiated, the electronic user key used to initiate a charging cycle can be used to open the locking mechanism, but another electronic user key cannot, and wherein, in use, a plug located in the socket is locked in position by the panel when the panel is locked in the closed position.

2. A charging station as claimed in claim 1, wherein the electronic user key is wireless.

3. A charging station as claimed in claim 2, wherein the electronic user key contains data.

4. A charging mechanism as claimed in claim 1, wherein the electronic user key comprises a transponder or Radio Frequency Identification (RFID) tag.

5. A charging station as claimed in claim 4, further comprising a transmitter for transmitting a signal to a transponder or a Radio Frequency Identification (RFID) tag.

6. A charging station as claimed in claim 4, further comprising a receiver for receiving a signal transmitted from a transponder or Radio Frequency Identification (RFID) tag.

7. A charging station as claimed in claim 1, wherein the charging cycle is stopped when the panel is moved to the open position.

8. A charging station as claimed in claim 1, wherein the electronic user key contains data and the charging station further comprising a processor for processing data received from the key.

9. A charging station as claimed in claim 1 further comprising an electronic display.

10. A charging station as claimed in claim 9, wherein the electronic user key contains data and, in use, the electronic display displays data received from the key.

11. A charging station as claimed in claim 9, wherein, in use, the electronic display displays information relating to the charging cycle.

12. A charging station as claimed in claim 1 further comprising an interface for connecting the charging station to a data network.

13. A charging station as claimed in claim 12, wherein the interface is wireless.

14. A charging station as claimed in claim 12, wherein, in use, the charging station communicates with a remote processor over said data network.

15. A charging station as claimed in claim 1, wherein the charging cycle is initiated when the locking mechanism is locked.

16. A charging station as claimed in claim 1, further comprising an indicator for emitting visible light in two or more different colours to indicate the status of the charging station.

17. A charging station as claimed in claim 16, wherein said indicator is capable of emitting light in three different colours.

18. A charging station as claimed in claim 16, wherein, in use, the indicator emits light of a first colour to indicate that the charging station is out of order.

19. A charging station as claimed in claim 18, wherein, in use, the indicator emits light of a second colour to indicate that the charging station is operational.

20. A charging station as claimed in claim 19, wherein, in use, the indicator emits light of a third colour to indicate that the charging station is charging.

21. A charging station as claimed in claim 20, wherein the first colour is red, the second colour is blue, and the third colour is green.

22. A charging station as claimed in claim 16, wherein the indicator is ring-shaped.

23. A charging station as claimed in claim 16, wherein the indicator comprises at least one light source.

24. A charging station as claimed in claim 23, wherein said at least one light source is a light emitting diode or a lamp.

25. A charging station as claimed in claim 23, comprising a plurality of light sources.

26. A charging station as claimed in claim 25, wherein, in use, the number of light sources illuminated is varied in response to changes in the status of the charging station.

27. A charging station as claimed in claim 16, wherein, in use, the intensity of the light emitted from the indicator is varied in response to changes in the status of the charging station.

* * * * *

UNITED STATES PATENT AND TRADEMARK OFFICE
CERTIFICATE OF CORRECTION

PATENT NO.       : 8,487,584 B2                                              Page 1 of 1
APPLICATION NO.  : 12/308034
DATED            : July 16, 2013
INVENTOR(S)      : Taylor-Haw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this
Eighth Day of September, 2015

Michelle K. Lee
*Director of the United States Patent and Trademark Office*